US010920633B2

(12) United States Patent
Ueda et al.

(10) Patent No.: US 10,920,633 B2
(45) Date of Patent: Feb. 16, 2021

(54) MAINTENANCE TOOL AND MAINTENANCE METHOD FOR EXHAUST PURIFICATION DEVICE

(71) Applicant: ISUZU MOTORS LIMITED, Tokyo (JP)

(72) Inventors: Yoshihisa Ueda, Fujisawa (JP); Yuuta Kageyama, Sagamihara (JP); Katsushi Osada, Ayase (JP)

(73) Assignee: ISUZU MOTORS LIMITED, Tokyo (JP)

( * ) Notice: Subject to any disclaimer, the term of this patent is extended or adjusted under 35 U.S.C. 154(b) by 238 days.

(21) Appl. No.: 15/555,430

(22) PCT Filed: Feb. 29, 2016

(86) PCT No.: PCT/JP2016/056077
§ 371 (c)(1),
(2) Date: Sep. 1, 2017

(87) PCT Pub. No.: WO2016/140193
PCT Pub. Date: Sep. 9, 2016

(65) Prior Publication Data
US 2018/0038253 A1 Feb. 8, 2018

(30) Foreign Application Priority Data
Mar. 5, 2015 (JP) .............................. JP2015-043424

(51) Int. Cl.
*F01N 3/36* (2006.01)
*F01N 3/20* (2006.01)
(Continued)

(52) U.S. Cl.
CPC ............. *F01N 3/20* (2013.01); *F01N 3/0253* (2013.01); *F01N 3/36* (2013.01); *F01N 9/002* (2013.01);
(Continued)

(58) Field of Classification Search
CPC . F01N 3/0253; F01N 3/20; F01N 3/36; F01N 9/002; F01N 2450/10; F01N 2450/30; F01N 2610/02
See application file for complete search history.

(56) References Cited

U.S. PATENT DOCUMENTS

| 1,422,211 | A | * | 7/1922 | Lamb | ..................... A62B 23/00 |
|---|---|---|---|---|---|
| | | | | | 423/210 |
| 3,247,665 | A | * | 4/1966 | Behrens | ..................... F01N 3/32 |
| | | | | | 60/292 |

(Continued)

FOREIGN PATENT DOCUMENTS

| CA | 2595155 A1 | 1/2009 |
|---|---|---|
| CN | 103561847 A | 2/2014 |

(Continued)

OTHER PUBLICATIONS

Extended European Search Report for related EP App No. 16758886.2 dated Jul. 4, 2018, 5 pgs.

(Continued)

*Primary Examiner* — Matthew T Largi
(74) *Attorney, Agent, or Firm* — Procopio, Cory, Hargreaves & Savitch LLP

(57) ABSTRACT

A maintenance pipe (30) used during maintenance of an exhaust purification device equipped with: a set of an oxidation catalyst (22) and a filter (23) for purifying exhaust gas from an engine (10); an upstream connecting pipe (16A) and a downstream connecting pipe (16B) which are mounted in a demountable way and guide the exhaust gas from the engine (10) to the oxidation catalyst (22); and an exhaust pipe injection device (24) and injectors (12) for increasing a concentration of unburned fuel contained in the exhaust gas. The maintenance pipe includes a flanged steel pipe (31) mounted to be replaceable with the downstream connecting pipe (16B), and a maintenance catalyst (32) that is housed in (Continued)

the flanged steel pipe (31), generates heat caused by oxidizing the unburned fuel contained in the exhaust gas from the engine (10), and heats the exhaust to discharge the exhaust to an exhaust downstream side.

2 Claims, 7 Drawing Sheets

(51) Int. Cl.
*F01N 9/00* (2006.01)
*F01N 3/025* (2006.01)

(52) U.S. Cl.
CPC ...... *F01N 2450/10* (2013.01); *F01N 2450/30* (2013.01)

(56) References Cited

U.S. PATENT DOCUMENTS

| | | | | |
|---|---|---|---|---|
| 3,884,037 | A * | 5/1975 | Barber | B01D 53/86 60/292 |
| 4,485,621 | A | 12/1984 | Wong | |
| 5,169,604 | A * | 12/1992 | Crothers, Jr. | F01N 3/2853 422/177 |
| 5,849,251 | A * | 12/1998 | Timko | B01D 53/9454 422/177 |
| 6,584,768 | B1 * | 7/2003 | Hecker | F01N 3/035 55/318 |
| 8,549,847 | B2 * | 10/2013 | Kamiya | B01D 46/0063 60/297 |
| 9,057,316 | B2 * | 6/2015 | Golin | F01N 13/1805 |
| 10,280,822 | B2 * | 5/2019 | Ishikawa | F01N 3/2803 |
| 10,323,557 | B2 * | 6/2019 | Kubota | E02F 3/325 |
| 2004/0139739 | A1 | 7/2004 | Kagenishi | |
| 2006/0153761 | A1 * | 7/2006 | Bandl-Konrad | B01D 53/96 423/239.1 |
| 2007/0169452 | A1 * | 7/2007 | Grimm | B01D 46/001 55/523 |
| 2011/0023472 | A1 * | 2/2011 | Saito | F01N 3/0335 60/311 |
| 2014/0044632 | A1 | 2/2014 | Zielinski et al. | |

FOREIGN PATENT DOCUMENTS

| | | |
|---|---|---|
| DE | 102004062897 A1 | 7/2006 |
| JP | S59-162316 A | 9/1984 |
| JP | 2003-120258 A | 4/2003 |
| JP | 2004-176571 A | 6/2004 |
| JP | 2006-204969 A | 8/2006 |
| JP | 2011-247213 A | 12/2011 |

OTHER PUBLICATIONS

First Office Action for related CN App No. 201680013593.2 dated Jan. 9, 2019, 11 pgs.

International Search Report and Written Opinion for PCT Application No. PCT/JP2016/056077 dated Apr. 12, 2016.

\* cited by examiner

US 10,920,633 B2

MAINTENANCE TOOL AND MAINTENANCE METHOD FOR EXHAUST PURIFICATION DEVICE

CROSS-REFERENCE TO RELATED APPLICATIONS

This application is a U.S. National Stage entry of PCT Application No. PCT/JP2016/056077, filed on Feb. 29, 2016, which claims priority to Japanese Patent Application No. 2015-043424, filed Mar. 5, 2015, the contents of which are incorporated herein by reference.

TECHNICAL FIELD

The present invention relates to a maintenance tool and a maintenance method for an exhaust purification device that purifies exhaust gas discharged from an internal combustion engine.

BACKGROUND ART

As an exhaust purification device for purifying exhaust gas discharged from an internal combustion engine such as a diesel engine or a gasoline engine, for example a device having an oxidation catalyst raising a temperature of exhaust gas caused by oxidizing unburned fuel, a filter for trapping a particulate matter (PM) in the exhaust gas, a selective catalytic reduction (SCR) catalyst and an NOx occlusion reduction type catalyst (hereinafter, referred to as a lean NOx trap (LNT) catalyst)) that purify a nitrogen compound (NOx) in the exhaust gas, etc. is known.

In the exhaust purification device, purification capacity of the filter is deteriorated when the PM contained in the exhaust gas adheres to the filter. Thus, forced regeneration for supplying the filter with the exhaust gas that is heated to a high temperature by supplying the unburned fuel to the oxidation catalyst, and burning and removing the PM adhered to the filter is performed (e.g., see JP-A-2006-204969).

SUMMARY OF THE INVENTION

Technical Problem

Even in the oxidation catalyst from which heat is generated by oxidizing the unburned fuel, clogging occurs on an upstream surface of the exhaust gas due to long-term use. Since smoke is discharged when the clogging makes progress, the oxidation catalyst is demounted to undergo water cleaning. However, there is a problem that there is a need to perform the demounting, the water cleaning, and mounting of the oxidation catalyst, and work requires time and effort. In addition, there is a problem that treatment of waste water caused by the water cleaning also requires time and effort.

A maintenance tool and a maintenance method of the present disclosure are directed to making easy maintenance work of an exhaust purification device.

Solution to Problem

A maintenance tool of the present disclosure is used during maintenance of an exhaust purification device which includes a purification member that purifies exhaust gas from an internal combustion engine, a connecting pipe that guides the exhaust gas from the internal combustion engine to the purification member and is mounted in a demountable way, and a fuel concentration increasing unit that increases a concentration of unburned fuel contained in the exhaust gas, and the maintenance tool includes: a tubular member mounted to be replaceable with the connecting pipe; and a heat generating member housed in the tubular member, configured to generate heat caused by oxidizing the unburned fuel contained in the exhaust gas from the internal combustion engine, and configured to heat the exhaust gas to discharge the exhaust gas to an exhaust downstream side.

A maintenance method of the present disclosure is applied to an exhaust purification device which includes a purification member that purifies exhaust gas from an internal combustion engine, a connecting pipe that guides the exhaust gas from the internal combustion engine to the purification member and is mounted in a demountable way, and a fuel concentration increasing unit that increases a concentration of unburned fuel contained in the exhaust gas, and the maintenance method includes: a first process of demounting the connecting pipe; a second process of mounting a maintenance tool, which includes a tubular member mounted to be replaceable with the connecting pipe, and a heat generating member housed in the tubular member, configured to generate heat caused by oxidizing the unburned fuel contained in the exhaust gas from the internal combustion engine, and configured to heat the exhaust gas to discharge the exhaust gas to an exhaust downstream side, instead of the connecting pipe; and a third process of increasing a concentration of the unburned fuel contained in the exhaust gas using the fuel concentration increasing unit.

Advantageous Effects of the Invention

According to the maintenance tool and the maintenance method of the present disclosure, the maintenance work of the exhaust purification device can be made easy.

DESCRIPTION OF EMBODIMENTS

Hereinafter, an embodiment of the present invention will be described in detail based on the attached drawings. The same components are given same reference signs, and names and functions thereof are the same. Therefore, detailed description of the same components will not be repeated.

Figure 1:
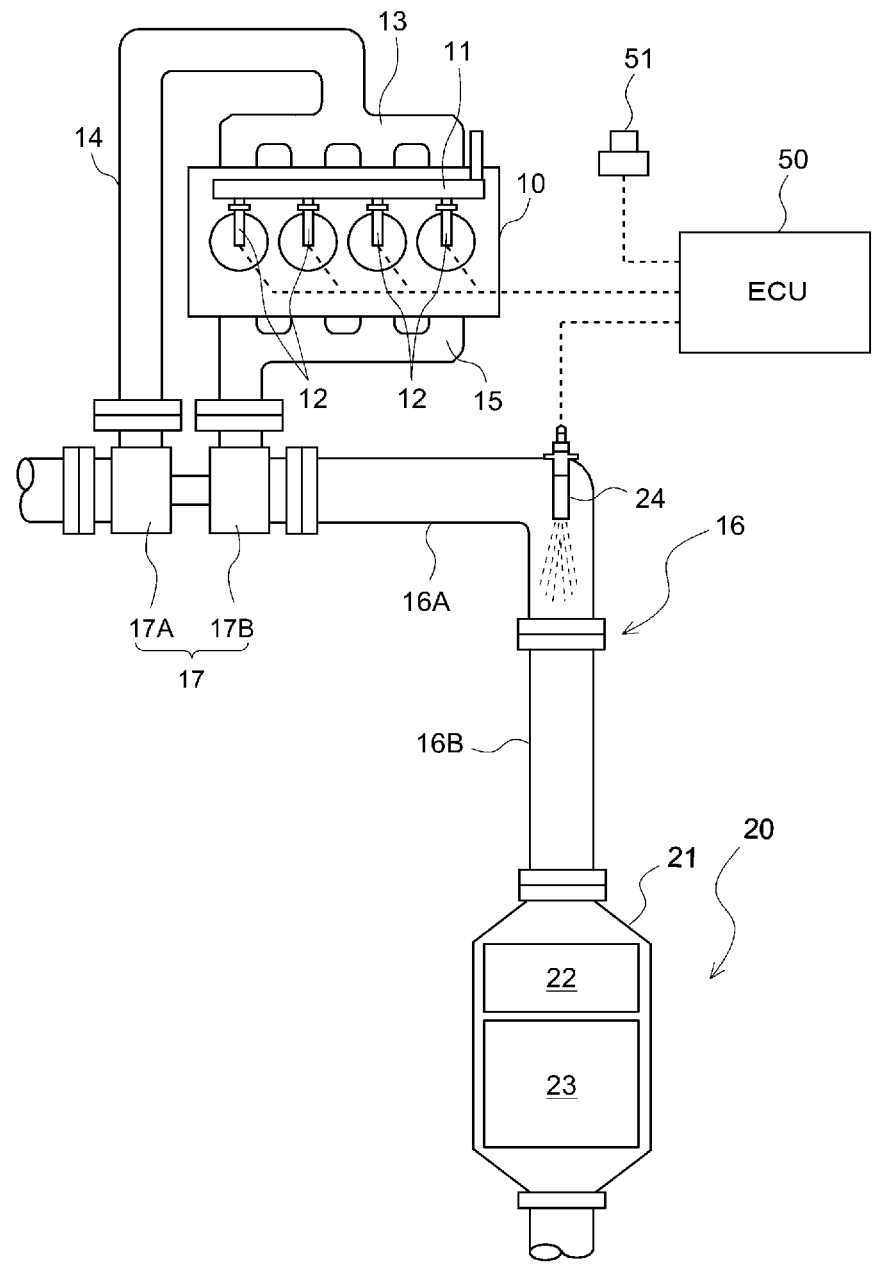
FIG. 1 is a schematic configuration diagram illustrating an internal combustion engine and an exhaust purification device serving as a maintenance target.

As illustrated in FIG. 1, injectors 12 for directly injecting high-pressure fuel accumulated in a common rail 11 into respective cylinders of a diesel engine 10 (hereinafter referred to simply as an engine 10) are provided for the respective cylinders of the engine 10. A fuel injection amount or a fuel injection timing of each of the injectors 12 is controlled in response to an instruction signal input from an electronic control unit 50 (an ECU 50).

An intake passage 14 for introducing fresh air is connected to an intake manifold 13 of the engine 10, and an exhaust passage 16 for leading out exhaust gas to the outside is connected to an exhaust manifold 15. A compressor 17A of a variable capacity supercharger 17 is provided in the middle of the intake passage 14. A turbine 17B of the variable capacity supercharger 17 and an exhaust purification device 20 are provided for the exhaust passage 16 from an exhaust upstream side in turn.

The variable capacity supercharger 17 and the exhaust purification device 20 are connected via connecting pipes 16A and 16B that form a part of the exhaust passage 16. In the example of FIG. 1, the variable capacity supercharger 17 and the exhaust purification device 20 are connected via the upstream connecting pipe 16A and the downstream connecting pipe 16B. A number or a shape of the connecting pipes is not limited to this example, and the connecting pipes can be set to an arbitrary number or shape.

The exhaust purification device 20 is configured to include an oxidation catalyst 22 and a particulate filter 23 (hereinafter, referred to simply as a filter 23) in a case 21 from an exhaust upstream side in turn. An exhaust pipe injection device 24 for injecting unburned fuel (mainly hydrocarbon (HC)) into the exhaust passage 16 in response to the instruction signal input from the ECU 50 is provided in the middle of the exhaust passage 16 upstream from the oxidation catalyst 22, and particularly the upstream connecting pipe 16A.

The oxidation catalyst 22 is an example of a purification member of the present disclosure, and is formed by carrying an oxidation catalyst component on a surface of a ceramic carrier such as a honeycomb structure. When the unburned fuel is supplied by post injection of the exhaust pipe injection device 24 or the injectors 12, the oxidation catalyst 22 oxidizes the unburned fuel to raise a temperature of the exhaust gas.

The filter 23 is an example of the purification member of the present disclosure, and is for instance formed such that a plurality of cells sectioned by porous partition walls are disposed in a flowing direction of the exhaust gas, and upstream and downstream sides of the cells are sealed alternately. When PM in the exhaust gas is trapped in pores or surfaces of the partition walls, and when an estimation amount of PM deposition reaches a predetermined amount, the filter 23 performs so-called filter regeneration by which the PM is burned and removed. The filter regeneration is performed which combusts and removes the PM. The filter-forced regeneration is performed by increasing a concentration of the unburned fuel in the exhaust gas to supply it to the oxidation catalyst 22 by exhaust pipe injection or the post injection, and raising a temperature of the exhaust gas flowing into the filter 23 to a PM combustion temperature by an oxidation reaction at the oxidation catalyst 22. The exhaust pipe injection device 24 for performing the exhaust pipe injection or the injector 12 for performing the post injection is an example of the fuel concentration increasing unit of the present disclosure.

The ECU 50 performs various kinds of control on the engine 10 and the like, and includes a well-known CPU or a ROM, a RAM, an input port, an output port, and the like. To perform the various kinds of control, sensor values of sensors (not shown) are input to the ECU 50. In addition, a switch signal from a maintenance switch 51 is input to the ECU 50. The maintenance switch 51 is a switch that is operated when forced regeneration of the filter 23 is performed. When the maintenance switch 51 is operated, the unburned fuel is injected from the exhaust pipe injection device 24, and the PM deposited on the filter 23 is burned and removed by the exhaust gas heated by the oxidation catalyst 22.

Figure 2:
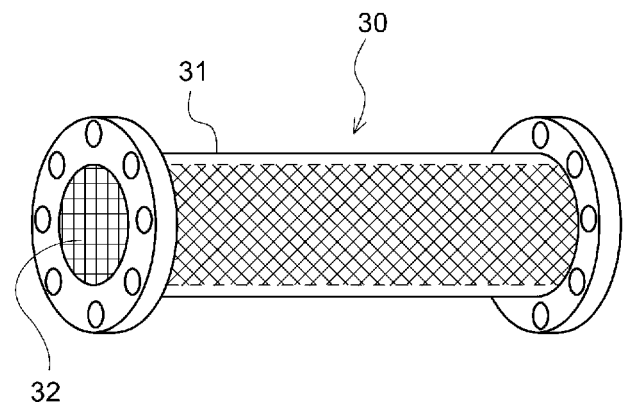
FIG. 2 is a schematic perspective diagram illustrating a maintenance pipe of the present embodiment.

The maintenance pipe 30 illustrated in FIG. 2 is an example of the maintenance tool of the present disclosure, and is used during maintenance for removing clogging occurring at an exhaust upstream side of the oxidation catalyst 22. The maintenance pipe 30 includes a flanged steel pipe 31 that is an example of a tubular member, and a maintenance catalyst 32 that is an example of a heat generating member.

The flanged steel pipe 31 is formed in the same shape and of the same material as the downstream connecting pipe 16B. As long as the flanged steel pipe 31 is formed in a shape in which it is mounted to be replaceable with the downstream connecting pipe 16B and is formed of a material having heat resistance over the temperature of the exhaust gas, different shapes and materials may be adopted.

The maintenance catalyst 32 is housed in the flanged steel pipe 31, generates heat caused by oxidizing the unburned fuel contained in the exhaust gas from the internal combustion engine, and heats the exhaust gas to discharge it to the exhaust downstream side. The maintenance catalyst 32 includes a ceramic carrier having a honeycomb structure becoming an exhaust flow passage like the oxidation catalyst 22, and carries the oxidation catalyst component on a surface of the carrier.

In the example of FIG. 2, the flanged steel pipe 31 has a shape in which ring-like discoid flanges are provided at opposite ends of a pipe main body having a cylindrical straight pipe shape. The maintenance catalyst 32 is formed in a columnar shape having approximately the same length as the pipe main body 31A.

Next, maintenance work (a maintenance method) of the oxidation catalyst 22 using the aforementioned maintenance pipe 30 will be described. The maintenance work is performed, for instance, by a dealer or at a maintenance shop of a vehicle on which the diesel engine 10 is mounted.

Figure 3:
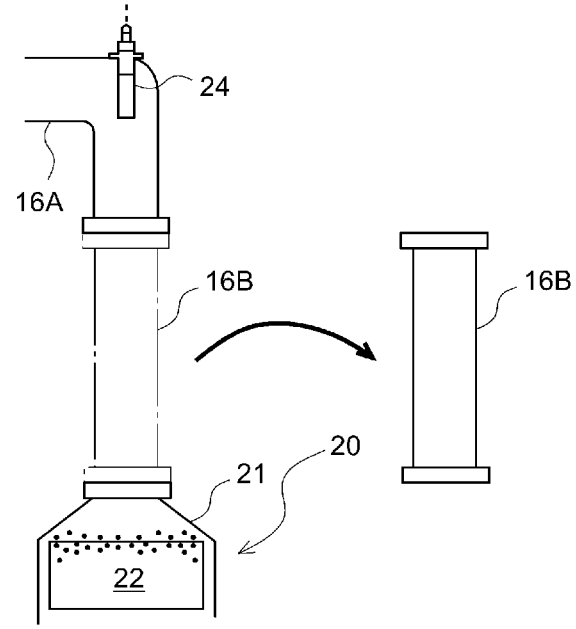
FIG. 3 is a schematic explanatory diagram illustrating a demounting process of a connecting pipe in a maintenance method of the present embodiment.
Figure 4:
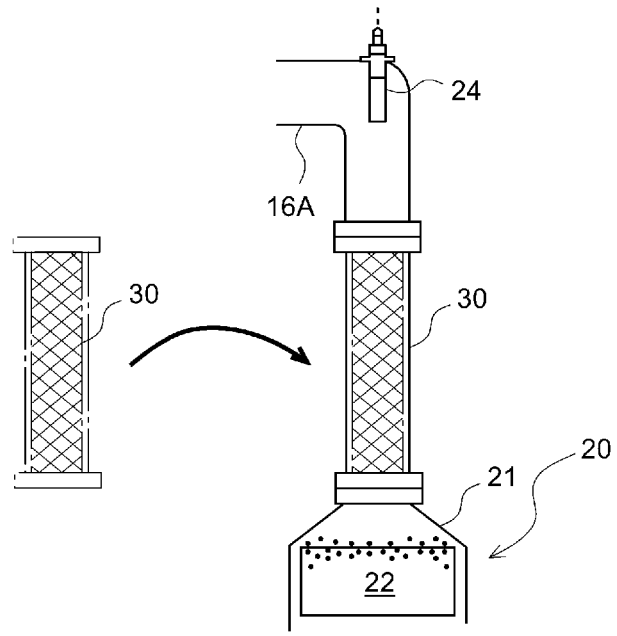
FIG. 4 is a schematic explanatory diagram illustrating the mounting process of a maintenance pipe in the maintenance method of the present embodiment.

As illustrated in FIG. 3, a demounting process (a first process) of demounting the downstream connecting pipe 16B is performed. The demounting process is performed in a shutdown state of the engine 10, and includes releasing a fastened state between the flanges of the upstream connecting pipe 16A and the downstream connecting pipe 16B, and releasing a fastened state between the flanges of the downstream connecting pipe 16B and the exhaust purification device 20 (the case 21). After the fastened state is released, the downstream connecting pipe 16B is demounted.

After the downstream connecting pipe 16B is demounted, a mounting process (a second process) of mounting the maintenance pipe 30 in place of the downstream connecting pipe 16B is performed. In the mounting process, the flanges of the upstream connecting pipe 16A and the maintenance pipe 30 are fastened by a plurality of sets of bolts and nuts, and the flanges of the downstream connecting pipe 16B and the exhaust purification device 20 (the case 21) are fastened by a plurality of sets of bolts and nuts.

Figure 5:
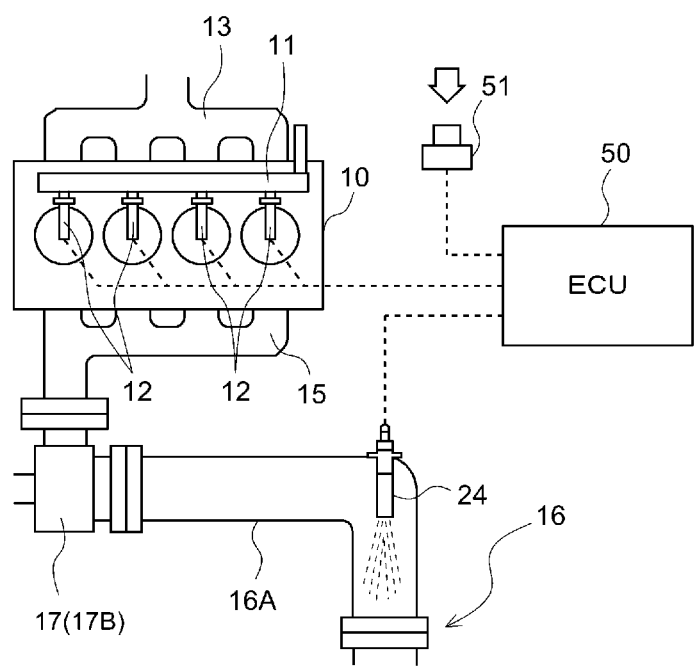
FIG. 5 is a schematic explanatory diagram illustrating a fuel injecting process in the maintenance method of the present embodiment.

After the maintenance pipe 30 is mounted, a fuel concentration increasing process (a third process) of increasing a concentration of the unburned fuel contained in the exhaust gas is performed. As illustrated in FIG. 5, the fuel concentration increasing process is for instance initiated by operating the maintenance switch 51 in an idling state of the engine 10. When an operation signal is input from the maintenance switch 51, the ECU 50 outputs an instruction signal to the exhaust pipe injection device 24. When the instruction signal is input, the exhaust pipe injection device 24 continues to inject the unburned fuel for a predetermined time (e.g., several minutes to a dozen minutes). Instead of the injection of the unburned fuel from the exhaust pipe injection device 24 or along with the injection of the unburned fuel, the post injection may be performed by the injectors 12.

Figure 6:
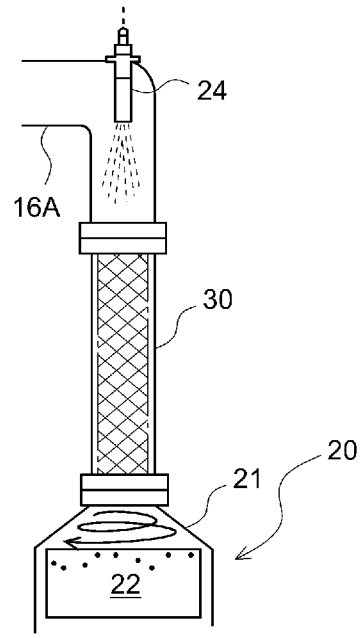
FIG. 6 is a schematic explanatory diagram illustrating combustion removal of PM in the maintenance method of the present embodiment.

As illustrated in FIG. 6, when the concentration of the unburned fuel contained in the exhaust gas increases, the maintenance catalyst 32 having the maintenance pipe 30 oxidizes the unburned fuel to raise a temperature of the exhaust gas. The exhaust gas passing through the maintenance catalyst 32 to reach a high temperature flows into the oxidation catalyst 22. Thereby, PM or tar that is attributed to clogging in the oxidation catalyst 22 is removed by combustion.

After the unburned fuel is injected for a predetermined time, or when another injection termination condition is established, the exhaust pipe injection caused by the exhaust pipe injection device 24 or the post injection caused by the injectors 12 is terminated. Afterwards, after the maintenance pipe 30 is cooled to a temperature suitable for replacement work, the maintenance pipe 30 is demounted, and the downstream connecting pipe 16B is connected again. Thereby, the maintenance work is terminated.

In this way, the maintenance pipe 30 of the present embodiment includes the flanged steel pipe 31 that is mounted to be replaceable with the downstream connecting pipe 16B, and the maintenance catalyst 32 that is housed in the flanged steel pipe 31, generates heat caused by oxidizing the unburned fuel contained in the exhaust gas from the engine 10, and heats the exhaust gas to discharge it to an exhaust downstream side.

In the maintenance work using the maintenance pipe 30, after the maintenance pipe 30 is mounted instead of the downstream connecting pipe 16B, the engine 10 is started to merely perform the exhaust pipe injection or the post injection, and thereby the clogging of the oxidation catalyst 22 can be eliminated. For this reason, the maintenance work can be made easy. Since no cleaning water is used, waste water treatment does not require time and effort. In this respect, the maintenance work can be made easy. In addition, since a calorific value capable of eliminating the clogging of the oxidation catalyst 22 is sufficient for a calorific value of the maintenance catalyst 32, a required amount of the oxidation catalyst component can be suppressed to one several-th of an amount of the oxidation catalyst component in the oxidation catalyst 22.

The contents of the present disclosure is not limited to the aforementioned embodiment, and the present disclosure may be appropriately modified without departing from the spirit and scope of the invention.

Figure 7A:
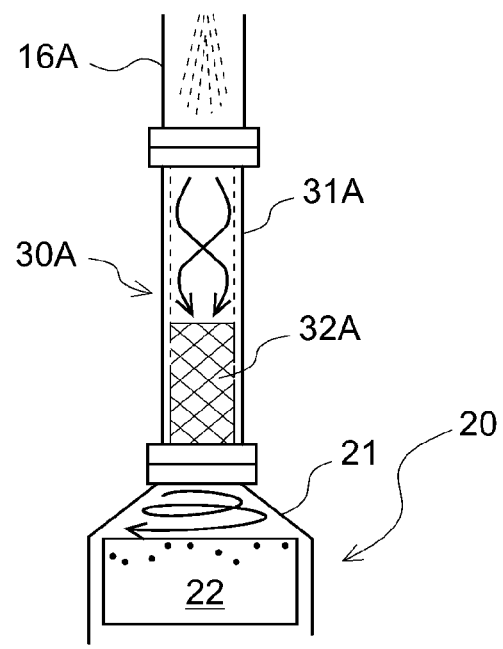
FIG. 7A is a diagram illustrating a first modification of a maintenance pipe, and illustrates the maintenance pipe mounted by disposing a maintenance catalyst in the vicinity of an oxidation catalyst.
Figure 7B:
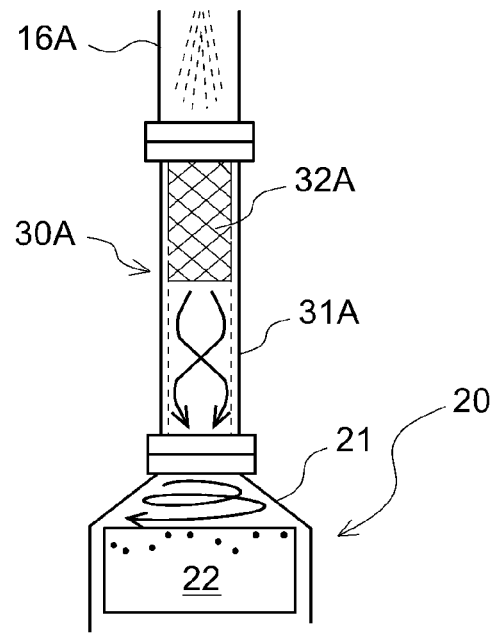
FIG. 7B is a diagram illustrating the first modification of the maintenance pipe, and illustrates the maintenance pipe mounted by disposing the maintenance catalyst in the vicinity of an exhaust pipe injection device.

For example, in a maintenance pipe 30A of a first modification illustrated in FIGS. 7A and 7B, a length of a maintenance catalyst 32A is set to be shorter than that of a flanged steel pipe 31A (to approximately the half of the length in the example of FIGS. 7A and 7B), and the maintenance catalyst 32A is disposed close to one side of the flanged steel pipe 31A. In the maintenance pipe 30 of the first modification, as illustrated in FIG. 7A, the maintenance pipe 30A is mounted such that the maintenance catalyst 32A is directed to moving toward an oxidation catalyst 22, and thereby high-temperature exhaust gas can be caused to flow into the oxidation catalyst 22. On the other hand, as illustrated in FIG. 7B, the maintenance pipe 30A is mounted such that the maintenance catalyst 32A is directed to moving away from the oxidation catalyst 22, and thereby high-temperature exhaust gas that is somewhat lower than in the state of FIG. 7A can be caused to flow into the oxidation catalyst 22. Since an interval between the maintenance catalyst 32A and the oxidation catalyst 22 is widened, a temperature of exhaust gas can be made uniform, uneven heating of a surface of the oxidation catalyst 22 can be suppressed.

Figure 8A:
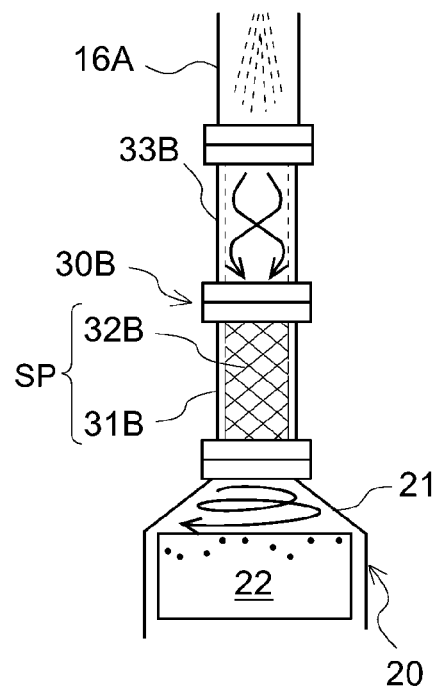
FIG. 8A is a diagram illustrating a second modification of a maintenance pipe, and illustrates the maintenance pipe mounted by disposing a maintenance catalyst in the vicinity of an oxidation catalyst.
Figure 8B:
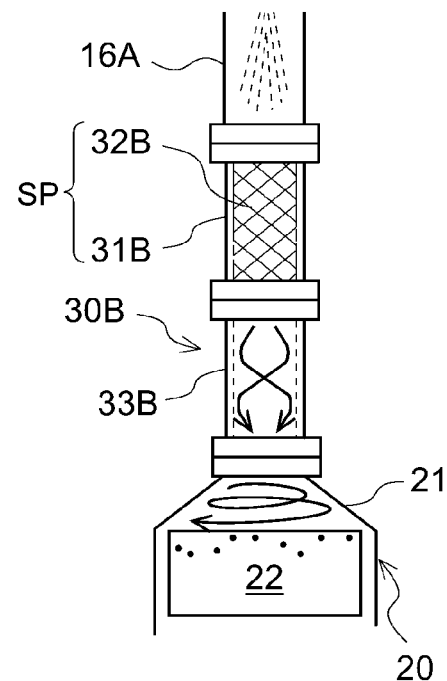
FIG. 8B is a diagram illustrating the second modification of the maintenance pipe, and illustrates the maintenance pipe mounted by disposing the maintenance catalyst in the vicinity of an exhaust pipe injection device.
Figure 8C:
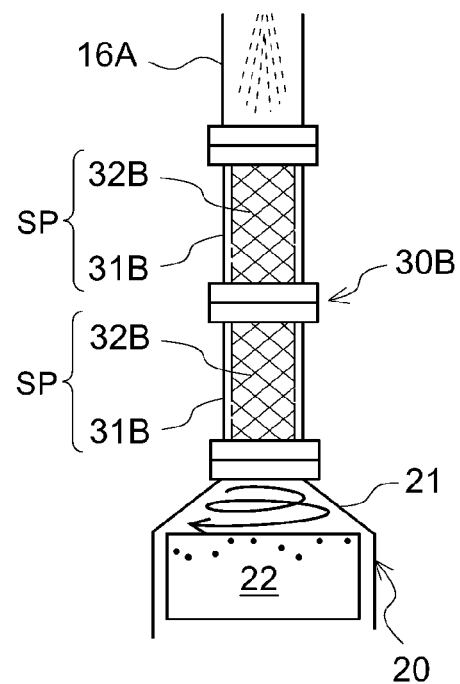
FIG. 8C is a diagram illustrating the second modification of the maintenance pipe, and illustrates the maintenance pipe mounted by disposing the maintenance catalyst in entirety in a longitudinal direction.

In a maintenance pipe 30B of a second modification illustrated in FIGS. 8A, 8B, and 8C, the maintenance pipe 30B is formed of a plurality of short pipes SP (a set of a flanged steel pipe 31B and a maintenance catalyst 32B), and also uses a spacer 33B configured of only the flanged steel pipe. In the examples of FIG. 8A, 8B, and FIG. 8C, lengths of the short pipes SP and the spacer 33B are set to a half of that of a downstream connecting pipe 16B. FIG. 8A is an example in which the short pipes SP are disposed close to an oxidation catalyst 22 and the spacer 33B is disposed close to the exhaust pipe injection device 24. In inverse relation to FIG. 8A, FIG. 8B is an example in which the spacer 33B is disposed close to the oxidation catalyst 22 and the short pipes SP are disposed close to the exhaust pipe injection device 24. FIG. 8C is an example in which two sets of short pipes SP are used.

In this way, the maintenance pipe 30B is formed by a combination of the plurality of short pipes SP and the spacer 33B, and thereby a calorific value of the maintenance pipe 30B or a flow of exhaust gas thereof can be adjusted. Thereby, a degree of freedom of the adjustment can be increased with respect to a temperature of the exhaust gas and the flow of the exhaust gas. In the second modification, the lengths of the short pipes SP and the spacer 33B are set to, but not limited to, the half of that of the downstream connecting pipe 16B. The lengths may be set to one third or one fourth of that of the downstream connecting pipe 16B. The lengths need not be divided equally. The combination of the short pipes SP and the spacer 33B has only to have the same length as the downstream connecting pipe 16B.

Figure 9:
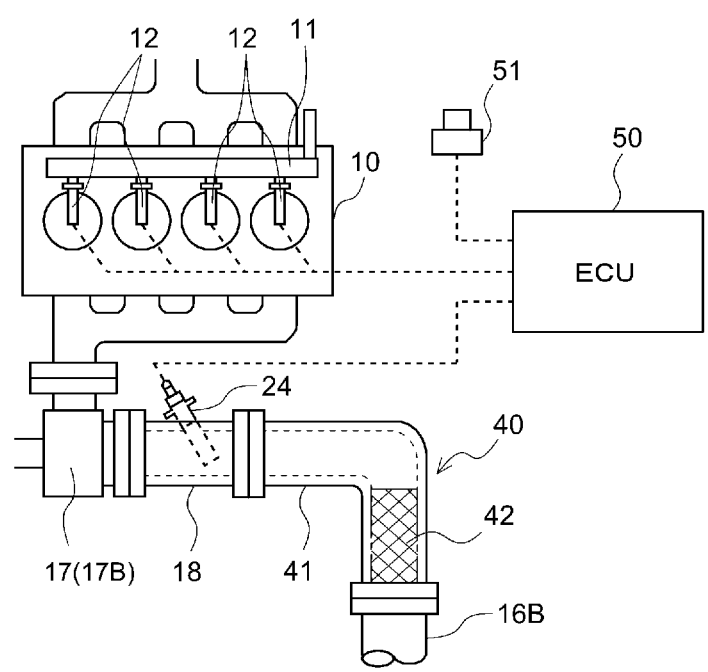
FIG. 9 is a diagram illustrating a third modification of a maintenance pipe.

A maintenance pipe 40 of a third modification illustrated in FIG. 9 is used instead of an upstream connecting pipe 16A. In the third modification, since an exhaust pipe injection device 24 is provided for an exhaust adapter 18 connected to an exhaust downstream side of a variable capacity supercharger 17, the maintenance pipe 40 (a flanged steel pipe 41 and a maintenance catalyst 42) can be connected instead of the upstream connecting pipe 16A. That is, if the connecting pipe is mounted on an exhaust downstream side relative to the fuel concentration increasing unit and on an exhaust upstream side relative to the oxidation catalyst 22 in a demountable state, the maintenance pipe 40 can be replaced with a maintenance pipe 30.

In the aforementioned embodiment, the oxidation catalyst 22 has been described as the purification member of the maintenance target, but another type of purification member may become the maintenance target. For example, the maintenance of the SCR catalyst or the LNT catalyst can also be performed in the same way using the aforementioned maintenance pipe 30, 30A or 30B.

This application is based upon and claims the benefit of priority from Japanese Patent Application No. 2015-043424, filed Mar. 5, 2015, the entire contents of which are incorporated herein by reference.

INDUSTRIAL APPLICABILITY

The maintenance tool and the maintenance method for the exhaust purification device of the present invention has an effect that the maintenance work of the exhaust purification device can be made easy, and is useful in that working man-hours or costs required for the maintenance work can be reduced to contribute to popularization and promotion of the exhaust purification device.

REFERENCE SIGNS LIST

10: Diesel engine
11: Common rail
12: Injector
13: Intake manifold
14: Intake passage
15: Exhaust manifold
16: Exhaust passage
16A: Upstream connecting pipe
16B: Downstream connecting pipe
20: Exhaust purification device
21: Case
22: Oxidation catalyst
23: Particulate filter
24: Exhaust pipe injection device
30, 30A, 30B: Maintenance pipe
31, 31A, 31B: Flanged steel pipe
32, 32A, 32B: Maintenance catalyst
40: Maintenance pipe
41: Flanged steel pipe
42: Maintenance catalyst
50: ECU
51: Maintenance switch
SP: Short pipe

The invention claimed is:

1. A maintenance method for an exhaust purification device which includes: an oxidation catalyst that is disposed in an exhaust passage connected to an internal combustion engine and purifies exhaust gas from the internal combustion engine; a connecting pipe that is provided at an upstream side from the oxidation catalyst so as to guide the exhaust gas from the internal combustion engine to the oxidation catalyst and is mounted in a demountable way; and a fuel injector that increases a concentration of unburned fuel contained in the exhaust gas, the maintenance method comprising:

a first process of demounting the connecting pipe;
a second process of mounting a maintenance tool in place of the demounted connecting pipe, wherein the maintenance tool includes: a tubular pipe, mounted at the upstream side from the oxidation catalyst; and a maintenance catalyst housed in the tubular pipe, configured to generate heat caused by oxidizing the unburned fuel contained in the exhaust gas from the internal combustion engine, and configured to heat the exhaust gas to discharge the exhaust gas to an exhaust downstream side, instead of the connecting pipe;
a third process of increasing a concentration of the unburned fuel contained in the exhaust gas using the fuel injector; and
a fourth process of mounting the connecting pipe demounted in the first process again in place of the maintenance tool after the third process,
wherein a length of the maintenance catalyst is shorter than that of the tubular pipe,
wherein the maintenance catalyst is disposed closer to an upstream end of the tubular pipe than a downstream end of the tubular pipe, the upstream end of the tubular pipe being farther away from the oxidation catalyst than the downstream end of the tubular pipe when the maintenance tool is mounted in place of the demounted connecting pipe.

2. The maintenance tool configured to perform the maintenance method of claim 1,
wherein the maintenance catalyst is formed by carrying a catalyst component on a surface of a heat-resistant carrier in which the exhaust passage is formed.

* * * * *